UNITED STATES PATENT OFFICE.

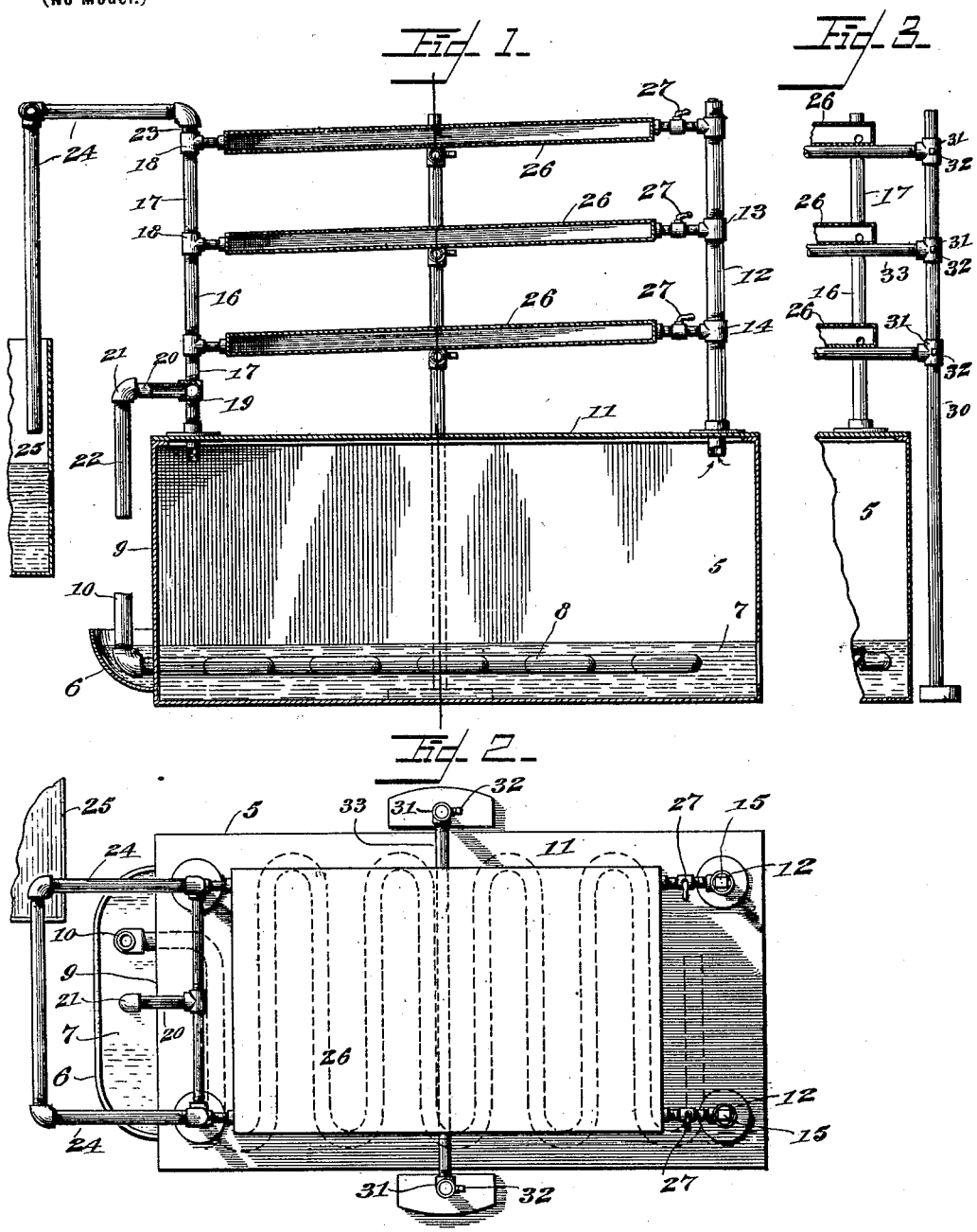

ROBERT M. BELLINGER, OF BRUNSWICK, GEORGIA.

EVAPORATOR.

SPECIFICATION forming part of Letters Patent No. 673,972, dated May 14, 1901.

Application filed August 14, 1899. Serial No. 727,231. (No model.)

*To all whom it may concern:*

Be it known that I, ROBERT M. BELLINGER, a citizen of the United States, residing at Brunswick, in the county of Glynn and State of Georgia, have invented a new and useful Evaporator, of which the following is a specification.

The invention relates to evaporators in general, and more particularly to that class designed for the evaporation of food products, both animal and vegetable, whether they be in solid or liquid form.

In the utilization of the apparatus it has been found to be especially adapted for the treatment by evaporation of marine-food products—such as oysters, clams, shrimps, &c.—and also for the treatment of meats and for the treatment of fruits and vegetables.

In the drawings forming a portion of this specification, and in which like numerals of reference indicate similar parts in the several views, Figure 1 is a view, partially in vertical section and partly in elevation, showing one embodiment of the invention. Fig. 2 is a plan view of Fig. 1. Fig. 3 is a detail showing a portion of the structure and the location and arrangement of auxiliary supporting means therefor.

Referring now to the drawings, the invention comprises a preferably rectangular tank 5, at one end of which and communicating therewith is a trough 6, having its upper end open, the communication between the trough and tank being near the bottom of the trough, so that water in the tank and trough may form a seal for the communicating opening. The tank 5 is adapted to receive a quantity of water 7, the level of which is below the upper edge of the trough 6, and immersed in this water and within the casing is a zigzag coil of pipe 8, lying in a single horizontal plane slightly above the floor of the tank. The discharge end of this coil opens below the surface of the water 7, while the inlet end is extended outwardly and through the end wall 9 of the tank and into the trough 6, and with which inlet end is connected a steam-supply pipe 10, leading from a boiler having any desired construction and location.

The tank 5 has an air-tight cover 11, and passed through this cover and adjacent the corners, at one end thereof, are vertical tubular standards in the form of pipes 12, including each a plurality of nipples loosely connected through the medium of T connections 13, into the ends of the heads of which the nipples are threaded, the stems 14 of these T connections extending mutually parallel and in the direction of the opposite end of the tank and having less diameter than the nipples. The uppermost T connection has its nipple extending thereabove provided with a plug 15, as shown.

Passed through the cover 11 and adjacent the corners at the opposite end from the standards 12 are additional standards 16, having nipples 17, connected by means of T connections 18, the T's 18 being the same in number as the T's 13 and lying opposite thereto. The lowermost nipple 17 is divided into two sections, as shown in Fig. 1, connected by means of a T connection 19, the stem of which has fixed thereto a nipple 20, leading outwardly therefrom and beyond the adjacent end of the tank, where it is provided with an elbow 21, connecting it with a nipple 22, which depends above the trough 6. The uppermost T's 18 have nipples 23 therein, forming connections with steam-exhaust pipes 24, leading to a hot-well 25.

Connected with the stems of the T's 13 and 18 through the medium of nipples are hollow rectangular pans 26, which are slanted downwardly from the T's 13 to the T's 18, cocks 27 being disposed between the pans and the first-named T's. As shown in the drawings, the nipples 12 have a greater diameter than the nipples 17, and hence if steam be supplied to the coil 8 the exhaust therefrom, in connection with the heating effect of the coil, will act to boil the water 7, from which steam will rise and will pass upwardly and through the nipples 12. From the nipples 12 the steam will pass into the pans 26 and will act to heat the pans, and from the pans a small percentage of steam, together with the water of condensation, will pass outwardly and into the nipples 17. The lower end of the lowermost nipple 17 is plugged, as shown, and hence the water of condensation passing downward will run out and through the nipples 20 and 21 and will drip into the trough 6. The uncondensed steam will pass upwardly and then outwardly through the pipes 24, in which it will condense and from which it will drop into the hot-well. The supply of steam to the several pans may be regulated or cut off by the stop-cocks 27, and thus the heat of the pans may be regulated. Also it will be seen that with this construction the pans are kept substantially free of water and at the same time the heat derived therefrom is absolutely dry and well adapted to the purpose for which the apparatus is intended.

In order to prevent sagging of the pans intermediate the standards, uprights 30 are disposed at opposite sides thereof, and upon these uprights are loosely disposed collars 31, having securing set-screws 32, the collars at opposite sides being connected by cross bars or pipes 33, which may thus be adjusted to receive a portion of the weight of the pan.

In the operation of the evaporation suitable trays of any desired material are supplied with the products to be treated and are disposed upon the several pans, after which the steam is turned on and they are allowed to remain until the moisture is driven therefrom.

Having thus described the invention, what I claim is—

1. An evaporator comprising a radiating permanently-closed tank, vertical pipes mounted upon opposite ends of the top of the tank, the pipes at one end of the tank having communication therewith, said pipes having laterally-extending nipples, radiating pans engaged with the nipples and communicating with the tank through the nipples and pipes at one end of the tank, an escape-pipe leading from the non-communicating vertical pipes and above the pans, a drip-pipe leading from said non-communicating pipes, and a trough disposed to receive from the drip-pipe and having communication with the tank.

2. An evaporator comprising a radiating tank permanently closed, vertical pipes mounted upon the top of the tank, the pipes at one end of the tank communicating therewith, said pipes having laterally-extending nipples, radiating pans engaged with the nipples and communicating with the tank through the nipples and pipes, an escape-pipe leading from the non-communicating vertical pipes above the pans, a drip-pipe also leading from said non-communicating vertical pipes and below the pans, a trough disposed to receive from the drip-pipe and having communication with the tank, and an imperforate pipe-coil lying adjacent to the bottom of the tank, one end of said coil leading outwardly of the tank and the other end opening into the tank, said tank being adapted to hold water on a level above the coil.

In testimony that I claim the foregoing as my own I have hereto affixed my signature in the presence of two witnesses.

ROBERT M. BELLINGER.

Witnesses:
HARRY H. HOLLANDER,
THEODORE DALTON.